(12) United States Patent
Chawla (10) Patent No.: US 11,823,389 B2
(45) Date of Patent: Nov. 21, 2023

(54) ROAD NETWORK MAPPING SYSTEM AND METHOD

(71) Applicant: Qatar Foundation for Education, Science and Community Development, Doha (QA)

(72) Inventor: Sanjay Chawla, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 733 days.

(21) Appl. No.: 16/723,829

(22) Filed: Dec. 20, 2019

(65) Prior Publication Data

US 2020/0200548 A1 Jun. 25, 2020

Related U.S. Application Data

(60) Provisional application No. 62/782,615, filed on Dec. 20, 2018.

(51) Int. Cl.
| | | |
|---|---|---|
| *G06T 7/12* | (2017.01) | |
| *G06V 20/10* | (2022.01) | |
| *G06V 10/82* | (2022.01) | |
| *G06N 3/084* | (2023.01) | |
| *G06F 16/29* | (2019.01) | |
| *G01C 21/00* | (2006.01) | |
| *G06V 10/764* | (2022.01) | |

(52) U.S. Cl.
CPC .......... *G06T 7/12* (2017.01); *G01C 21/3815* (2020.08); *G01C 21/3852* (2020.08); *G06F 16/29* (2019.01); *G06N 3/084* (2013.01); *G06V 10/764* (2022.01); *G06V 10/82* (2022.01); *G06V 20/182* (2022.01); *G06T 2207/10032* (2013.01); *G06V 20/194* (2022.01)

(58) Field of Classification Search
None
See application file for complete search history.

(56) References Cited

U.S. PATENT DOCUMENTS

| | | | | |
|---|---|---|---|---|
| 2006/0047421 A1* | 3/2006 | Goldberg | .............. | H04L 45/122 701/533 |
| 2013/0321401 A1* | 12/2013 | Piemonte | ............. | G09B 29/006 345/419 |
| 2013/0328937 A1* | 12/2013 | Pirwani | .............. | G01C 21/3815 345/660 |
| 2014/0079297 A1* | 3/2014 | Tadayon | .............. | G06V 40/172 382/118 |
| 2014/0278052 A1* | 9/2014 | Slavin | ................ | G01C 21/3492 701/400 |

(Continued)

OTHER PUBLICATIONS

Cheng et al., "Automatic Road Detection and Centerline Extraction via Cascaded End-to-End Convolutional Neural Network", 2017, IEEE Transactions on Geoscience and Remote Sensing, vol. 55, No. 6, Jun. 2017, pp. 3.*

(Continued)

*Primary Examiner* — Guillermo M Rivera-Martinez
(74) *Attorney, Agent, or Firm* — Martin & Ferraro, LLP (57) ABSTRACT

A method and system of constructing a network map from imagery comprising using an iterative search process guided by a CNN-based decision function to derive a network graph directly from the output of the CNN.

18 Claims, 4 Drawing Sheets

(56) References Cited

U.S. PATENT DOCUMENTS

| | | | | |
|---|---|---|---|---|
| 2015/0347629 A1* | 12/2015 | Pajor | .................. | G01C 21/3446 |
| | | | | 707/693 |
| 2016/0086078 A1* | 3/2016 | Ji | .......................... | G06N 3/084 |
| | | | | 382/157 |
| 2018/0189578 A1* | 7/2018 | Yang | ....................... | G01C 21/32 |
| 2018/0307911 A1* | 10/2018 | Zohourian | .......... | H04N 5/23229 |
| 2019/0286921 A1* | 9/2019 | Liang | .................... | G06F 16/587 |
| 2020/0017117 A1* | 1/2020 | Milton | ................... | G07C 5/008 |
| 2020/0026283 A1* | 1/2020 | Barnes | .................. | G06V 20/58 |
| 2020/0167654 A1* | 5/2020 | Guo | ..................... | G06N 3/0427 |

OTHER PUBLICATIONS

Mattyus et al., "DeepRoadMapper: Extracting Road Topology from Aerial Images",2017, 2017 IEEE International Conference on Computer Vision, DOI 10.1109/ICCV.2017.372, pp. 3458-3466.*

Bastani et al., "RoadTracer: Automatic Extraction of Road Networks from Aerial Images", 2018, 2018 IEEE/CVF Conference on Computer Vision and Pattern Recognition, DOI 10.1109/CVPR.2018.00496, pp. 4720-4728.*

Bastani et al., "Machine-Assisted Map Editing", 2018, SIGSPATIAL '18: Proceedings of the 26th ACM SIGSPATIAL International Conference on Advances in Geographic Information SystemsNov. 2018, pp. 23-32,/doi.org/10.1145/3274895.3274927.*

* cited by examiner

DeepRoadMapper     Segmentation (Ours)     RoadTracer

ROAD NETWORK MAPPING SYSTEM AND METHOD

RELATED APPLICATION

The present application claims the benefit of U.S. Provisional Patent Application No. 62/782,615, filed on Dec. 20, 2018, which is incorporated herein by reference.

FIELD

The present invention relates to mapping, preferably utilizing the automatic extraction of infrastructure network information from imagery, principally a road network.

BACKGROUND

Mapping road networks is currently both expensive and labour-intensive. High-resolution aerial imagery provides a promising avenue to automatically infer a road network. Prior work uses convolutional neural networks (CNNs) to detect which pixels belong to a road (segmentation), and then uses complex post-processing heuristics to infer graph connectivity. Such segmentation methods have high error rates because noisy CNN outputs are difficult to correct.

Creating and updating road maps is a tedious, expensive, and often manual process today. Accurate and up-to-date maps are especially important given the popularity of location-based mobile services and the impending arrival of autonomous vehicles. Several companies are investing hundreds of millions of dollars on mapping the world, but despite this investment, error rates are not small in practice, with map providers receiving many tens of thousands of error reports per day. In fact, even obtaining "ground truth" maps in well-traveled areas may be difficult; recent work reported that the discrepancy between OpenStreetMap (OSM) and the TorontoCity dataset was 14% (the recall according to a certain metric for OSM was 0.86).

Aerial imagery provides a promising avenue to automatically infer the road network graph. In practice, however, extracting maps from aerial images is difficult because of occlusion by trees, buildings, and shadows (see FIG. 1). Prior approaches do not handle these problems well. Almost universally, they begin by segmenting the image, classifying each pixel in the input as either road or non-road. They then implement a complex post-processing pipeline to interpret the segmentation output and extract topological structure to construct a map. Noise frequently appears in the segmentation output, making it hard for the post-processing steps to produce an accurate result.

The present invention seeks to provide an improved method and system for mapping.

SUMMARY

Some embodiments provide a new method of automatically constructing accurate road network maps by analysing and extracting data from aerial images using an iterative search process guided by a CNN-based decision function to derive a road network graph directly from the output of the CNN. Embodiments of the invention deliver a representation of a road network, a road network document, a map document annotated with a road network or a fresh map document with a road network identified.

Whilst embodiments of the invention are described with reference to road networks, the invention is also applicable to other connected networks, i.e. infrastructure networks which are interconnected such as other carriageways: railroads and other track-laid routes such as monorails, pipelines/conduit networks, waterways: rivers, streams, tributaries and manmade water networks and in rural environments: pathways, footpaths, bridleways, rural tracks, or climbing routes.

A comparison of the conventional segmentation method with iterative search processes embodying the present invention in fifteen cities finds that at a 5% error rate, embodiments of the invention correctly captures 45% more junctions across these cities.

According to one aspect, there is provided a method of constructing a network map from imagery comprising: using an iterative search process guided by a CNN-based decision function to derive a network graph directly from the output of the CNN.

In some embodiments, the iterative search process constructs the network map by adding individual segments one at a time.

In some embodiments, the iterative search process proceeds along elements classified as a network element starting from a single location known to be on the network and adds vertices and edges along the path that the search process follows.

In some embodiments, the CNN-based decision function is invoked at each step to determine the best action to take: either add an edge to the network being mapped or step back to a previous vertex.

In some embodiments, the method further comprises deciding where to start a walk in G* to pick the next vertex by:
applying a map-matching algorithm to find a path in G* that is most similar to a path in G ending at $S_{top}$;
obtaining the path p in G, by performing a random walk in G starting from $S_{top}$;
stopping the random walk after traversing a configurable number of vertices w (e.g. w=10) or when there are no vertices adjacent to the current vertex that haven't already been traversed earlier in the search algorithm walk;
matching this path to the path p* in G* to which it is most similar.

In some embodiments, method comprises using a map-matching method and if v is the endpoint of the last edge in p*, starting the walk in G* at v and maintaining a set E containing edges of G* that have already been explored during the walk, E is initially empty, and on each training step, after deriving p* from map-matching, adding each edge in p* to E, then, when performing the walk in G*, avoid traversing edges that are in E again.

In some embodiments, the CNN-based decision function decides on the next segment to add given as input the portion of the network constructed so far without generating an intermediate image representation of the network.

In some embodiments, the iterative search process is an iterative graph process which comprises:

---

Input: A starting location $v_0$ and the bounding box B
initialize graph G and vertex stack S with $v_0$
while S is not empty do
    action, $\alpha$ := decision_func(G, $S_{top}$, Image)
    u := $S_{top}$ + (cos $\alpha$, D sin $\alpha$)
    if action = stop or u is outside B then
        pop $S_{top}$ from S

```
    else
        add vertex u to G
        add an edge ($S_{top}$, u) to G
        push u onto S
    end if
end while
```

In some embodiments, the method further comprises: directly outputting the graph from the iterative graph process which corresponds to an inferred road network.

In some embodiments, the decision function repeatedly selects a stop action until the search returns to $v_0$ and S becomes empty, wherein when S is empty, the construction of the network is complete.

In some embodiments, the imagery comprises one or more aerial images.

In some embodiments, the iterative search process is performed on imagery in which pixels are classified as "network" or "non-network".

In some embodiments, the method comprises performing a training procedure for the decision function.

In some embodiments, the training procedure comprises: generating training examples dynamically by running the iterative search with the CNN as the decision function during training.

In some embodiments, the training procedure comprises: performing a dynamic labelling process to generate training examples.

In some embodiments, given a region ($v_0$,B), training begins by initialising an instance of the search algorithm (G,S), where G is the partial graph (initially containing only $v_0$) and S is the vertex stack, and wherein on each training step, as during inference, the CNN is fed-forward to decide on an action based on an output layer, and update G and S based on that action.

In some embodiments, method comprises updating G and S based on the CNN output and not an oracle output.

In some embodiments, on each training step, based on G*, identify the set of angles R where there are unexplored network elements from $S_{top}$,
    convert R into a target output vector O*,
    if R is empty, then $o_{stop}$*=1, else $o*_{walk}$−1, and for each angle θ∈R, set $o_i$*=1, where i is the closest walkable angle to θ,
    compute a loss between O and O* and apply back-propagation to update the CNN parameters.

According to another aspect, there is provided a system for constructing a network map from imagery, the system comprising a processor and a memory, the memory storing executable instructions which, when executed by the processor, cause the processor to: using an iterative search process guided by a CNN-based decision function to derive a network graph directly from the output of the CNN.

According to another aspect, there is provided an apparatus for constructing a network map from imagery, the apparatus comprising: a CNN-based decision module configured to receive and process image data and to output CNN-based function data; and a search module coupled to the CNN-based decision module and configured to use an iterative search process guided by the CNN-based decision function data to derive a network graph directly from the output CNN-based function data.

In some embodiments, the network map is of a connected infrastructure network comprising one or more of: carriageways, railroads, viaducts, bridges, monorails, pipelines/conduit networks, waterways, rivers, streams, tributaries, canals, aqueducts, man-made water networks, pathways, footpaths, bridleways, rural tracks, and/or climbing routes.

In some embodiments, the output of the method is a data file of a road network, a representation of a road network, a road network document, a map document annotated with a road network or a fresh map document with a road network identified.

BRIEF DESCRIPTION OF THE DRAWINGS

In order that the present invention and embodiments thereof can be more readily understood, embodiments thereof will now be described, by way of example, with reference to the accompanying drawings, in which:

FIG. 1 shows aerial imagery illustrating how occlusions by trees, buildings, and shadows make it difficult for humans to infer road connectivity.

FIGS. 2A-2C show stages of segmentation post-processing; FIG. 2A shows the segmentation output; FIG. 2B shows a graph extracted through morphological thinning and the Douglas-Peucker method; and FIG. 2C shows a graph yielded after refinement heuristics are applied to remove basic types of noise.

FIG. 3 shows an example where noise in the segmentation output (left) is too extensive for refinement heuristics to correct; the graph after refinement on the right; and an overlay of the inferred graph (yellow) over ground truth from OSM (blue).

FIG. 4 shows blue lines of road and circles representing search process points, a walk through by the iterative search process embodying the present invention.

FIG. 5 shows a blue line of road and the black dots show G—here CNN trained on static training examples exhibits problematic behaviour during inference as the system veers off of the road represented by the blue path.

FIG. 6 shows a blue line of road and the black dots show G and illustrates a naive oracle that simply matches Stop to the closest location on G* fails, since it directs the system towards the bottom road instead of returning to the top road. Here, the black circles make up G, while the blue corresponds to actual road positions.

FIG. 7 shows average $F_{correct}$ and $F_{error}$ over the 15 test cities.

FIG. 8 shows average TOPO recall and error rate over the test cities.

FIGS. 9A-9C show the trade-off between error rate and recall in a small crop from Boston as we increase the threshold for the segmentation approach. The junction metric error rates in the crop from left to right are 18%, 13%, and 8%. The map with 18% error is too noisy to be useful.

FIG. 10 compares inferred road networks in Chicago (top), Boston, Salt Lake City, and Toronto (bottom); an overlay of the inferred graph (yellow) over ground truth from OSM (blue); inferred graphs correspond to thresholds that yield 5% average $F_{error}$ for RoadTracer and the segmentation approach, and 19% $F_{error}$ for DeepRoadMapper (as it does not produce results with lower average error).

DETAILED DESCRIPTION

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The fundamental problem with a segmentation-based approach is that the CNN is trained only to provide local information about the presence of roads. Key decisions on how road segments are inter-connected to each other are delegated to an error-prone post-processing stage that relies on heuristics instead of machine learning or principled algorithms.

Conventional:
1) Segmentation approach with CNN to identify presence of roads; and
2) Heuristic post-processing stage to identify interconnections.

Rather than rely on an intermediate image representation, the method of some embodiments seeks to provide an approach that produces the road network directly from the CNN. However, it is not obvious how to train a CNN to learn to produce a graph from images.

In more detail, some embodiments seek to present an approach that uses an iterative graph construction process for extracting graph structures from images. These embodiments construct the road network by adding individual road segments one at a time, using a novel CNN architecture to decide on the next segment to add given as input the portion of the network constructed so far. This embodiment eliminates the intermediate image representation of the road network, and avoid the need for extensive post-processing that limits the accuracy of prior conventional methods.

Training the CNN decision function is challenging because the input to the CNN at each step of the search depends on the partial road network generated using the CNN up to that step. Standard approaches that use a static set of labelled training examples are typically inadequate. Instead, some embodiments seek to provide a dynamic labelling approach to produce training examples on the fly as the CNN evolves during training. This procedure resembles reinforcement learning, but is used in an efficient supervised training procedure.

For example, the approach is evaluated using aerial images covering 24 square km areas of 15 cities, after training the model on 25 other cities. In the evaluation, two baselines are used; DeepRoadMapper and the own segmentation approach. Across the 15 cities, the main experimental finding is that, at a 5% average error rate on a junction-by-junction matching metric, the implementation of some embodiments, referred to herein as RoadTracer, correctly captures 45% more junctions than the segmentation approach (0.58 vs 0.40). DeepRoadMapper fails to produce maps with better than a 19% average error rate. Because accurately capturing the local topology around junctions is crucial for applications like navigation, these results suggest that RoadTracer is an important step forward in fully automating map construction from aerial images.

Classifying pixels in an aerial image as "road" or "non-road" (in the broader sense as "network" or "non-network") is a well-studied problem, with solutions generally using probabilistic models. Barzobar et al. build geometric probabilistic models of road images based on assumptions about local road-like features, such as road geometry and color intensity, and draw inferences with MAP estimation. Wegner et al. use higher-order conditional random fields (CRFs) to model the structures of the road network by first segmenting aerial images into superpixels, and then adding paths to connect these superpixels.

More recently, CNNs have been applied to road segmentation. However, the output of road segmentation, consisting of a probability of each pixel being part of a road, cannot be directly used as a road network graph.

To extract a road network graph from the segmentation output, Cheng et al. apply binary thresholding and morphological thinning to produce single-pixel-width road centerlines. A graph can then be obtained by tracing these centerlines. Mattyus' et al. propose a similar approach called DeepRoadMapper, but add post-processing stages to enhance the graph by reasoning about missing connections and applying heuristics. This solution yields promising results when the road segmentation has modest error.

However, as shown below, heuristics do not perform well when there is uncertainty in segmentation, which can arise due to occlusion, ambiguous topology, or complex topology such as parallel roads and multi-layer roads.

Rather than extract the road graph from the result of segmentation, some solutions directly extract a graph from images. Hinz et al. produce a road network using a complex road model that is built using detailed knowledge about roads and their context, such as nearby buildings and vehicles. Hu et al. introduce road footprints, which are detected based on shape classification of the homogeneous region around a pixel. A road tree is then grown by tracking these road footprints. Although these approaches do not use segmentation, they involve numerous heuristics and assumptions that resemble those in the post-processing pipeline of segmentation-based approaches, and thus are susceptible to similar issues.

Inferring road maps from GPS trajectories has also been studied. However, collecting enough GPS data that can cover the entire map in both space and time is challenging, especially when the region of the map is large and far from the city core. Nevertheless, GPS trajectories may be useful to improve accuracy in areas where roads are not visible from the imagery, to infer road connectivity at complex interchanges where roads are layered, and to enable more frequent map updates.

Automatic Map Inference

The goal of automatic map inference is to produce a road network map, i.e., a graph where vertices are annotated with spatial coordinates (latitude and longitude), and edges correspond to straight-line road segments. Vertices with three or more incident edges correspond to road junctions (e.g. intersections or forks). Like prior methods, we focus on inferring undirected road network maps, since the directionality of roads is generally not visible from aerial imagery.

Segmentation Approaches

Segmentation-based approaches have two steps. First, each pixel is labelled as either "road" or "non-road". Then, a post-processing step applies a set of heuristics to convert the segmentation output to a road network graph.

State-of-the-art techniques share a similar post-processing pipeline to extract an initial graph from the segmentation output. The segmentation output is first thresholded to obtain a binary mask. Then, they apply morphological thinning to produce a mask where roads are represented as one-pixel-wide centrelines. This mask is interpreted as a graph, where set pixels are vertices and edges connect adjacent set pixels. The graph is simplified with the Douglas-Peucker method.

Figure 1:
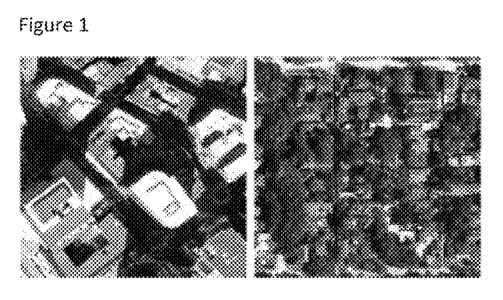
Figure 2A:
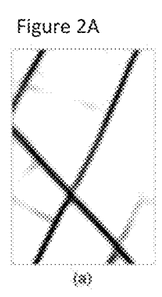
Figure 2B:
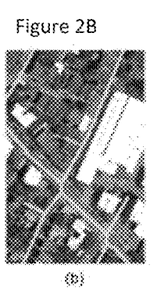
Figure 2C:
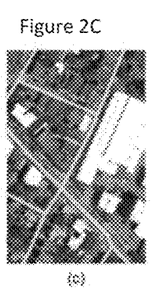

Because the CNN is trained with a loss function evaluated independently on each pixel, it will yield a noisy output in regions where it is unsure about the presence of a road. As shown in FIGS. 2A and 2B, noise in the segmentation output will be reflected in the extracted graph. Thus, several methods have been proposed to refine the initial extracted graph. FIG. 2C shows the graph after applying three refinement heuristics: pruning short dangling segments, extending dead-end segments, and merging nearby junctions.

Figure 3:
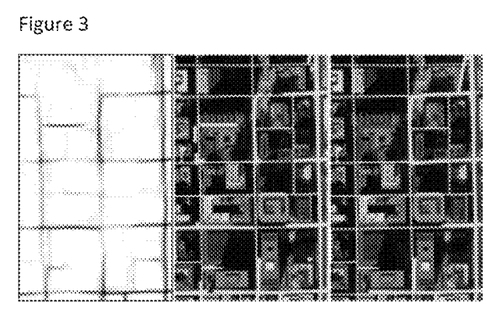

Although refinement is sufficient to remove basic types of noise, as in FIGS. 2A-2C, we find that many forms of noise are too extensive to compensate for. In FIG. 3, we show an example where the segmentation output contains many gaps, leading to a disconnected graph with poor coverage.

Given this segmentation output, even a human would find it difficult to accurately map the road network. Because the CNN is trained only to classify individual pixels in an image as roads, it leaves us with an untenable jigsaw puzzle of deciding which pixels form the road centerlines, and where these centerlines should be connected.

These findings convinced us that we need a different approach that can produce a road network directly, without going through the noisy intermediate image representation of the road network. We propose an iterative graph construction architecture to do this. By breaking down the mapping process into a series of steps that build a road network graph iteratively, we will show that we can derive a road network from the CNN, thereby eliminating the requirement of a complex post-processing pipeline and yielding more accurate maps.

RoadTracer: Iterative Graph Construction

In contrast to the segmentation approach, the approaches of some embodiments comprise a search algorithm, guided by a decision function implemented via a CNN, to compute the graph iteratively.

The search algorithm "walks" along roads starting from a single location known to be on the road network. Vertices and edges are added in the path that the search algorithm follows. The decision function is invoked at each step to determine the best action to take: either add an edge to the road network, or step back to the previous vertex in the search tree.

Algorithm 1 shows the pseudocode for the search procedure of some embodiments.

---
Algorithm 1 Iterative Graph Construction
---

Input: A starting location $v_0$ and the bounding box B
  initialize graph G and vertex stack S with $v_0$
  while S is not empty do
    action, α := decision_func(G, $S_{top}$, Image)
    u := $S_{top}$ + (D cos α, D sin α)

---
Algorithm 1 Iterative Graph Construction
--- if action = stop or u is outside B then
      pop $S_{top}$ from S
    else
      add vertex u to G
      add an edge ($S_{top}$, u) to G
      push u onto S
    end if
  end while We input a region ($v_0$,B), where $v_0$ is the known starting location, and B is a bounding box defining the area in which we want to infer the road network. The search algorithm maintains a graph G and a stack of vertices S that both initially contain only the single vertex $v_0$. $S_{top}$, the vertex at the top of S, represents the current location of the search.

Figure 4:
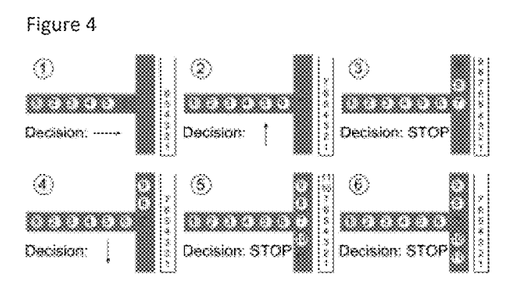

Referring to FIG. 4: Exploring a T intersection in the search process. The blue path represents the position of the road in the satellite imagery. Circles are vertices in G, with Stop in purple and v0 in orange. Here, the decision function makes correct decisions on each step.

At each step, the decision function is presented with G, $S_{top}$, and an aerial image centred at $S_{top}$'s location. It can decide either to walk a fixed distance D (for example D=12 meters) forward from $S_{top}$ along a certain direction, or to stop and return to the vertex preceding $S_{top}$ in S. When walking, the decision function selects the direction from a set of a angles that are uniformly distributed in $[0,2\pi)$. Then, the search algorithm adds a vertex u at the new location (i.e., D away from $S_{top}$ along the selected angle), along with an edge ($S_{top}$, u), and pushes u onto S (in effect moving the search to u).

If the decision process decides to "stop" at any step, we pop $S_{top}$ from S. Stopping indicates that there are no more unexplored roads (directions) adjacent to $S_{top}$. Note that because only new vertices are ever pushed onto S, a "stop" means that the search will never visit the vertex $S_{top}$ again.

FIG. 4 shows an example of how the search algorithm proceeds at an intersection. When an intersection is reached, we first follow the upper branch, and once we reach the end of this branch, the decision function selects the "stop" action. Then, the search returns to each vertex previously explored along the left branch. Because there are no other roads adjacent to the upper branch, the decision function continues to select the stop action until we come back to the intersection. At the intersection, the decision function leads the search down the lower branch. Once we reach the end of this branch, the decision function repeatedly selects the stop action until we come back to $v_0$ and S becomes empty. When S is empty, the construction of the road network is complete.

Since road networks consist of cycles, it is also possible that we will turn back on an earlier explored path. The search algorithm includes a simple merging step to handle this: when processing a walk action, if u is within distance 3D of a vertex v e G, but the shortest distance in G from $S_{top}$ to v is at least 6D, then we add an edge (u,v) and don't push u onto S. This heuristic prevents small loops from being created, e.g. if a road forks into two at a small angle.

Lastly, to avoid the algorithm walking out of the bounding box B, when processing a walk action, if u is not contained in B, then we treat it as a stop action.

CNN decision function. A crucial component of the algorithm is the decision function, which we implement with a CNN. The input layer consists of a d×d window centred on $S_{top}$. This window has four channels. The first three channels are the RGB values of the d×d portion of aerial imagery around $S_{top}$. The fourth channel is the graph constructed so far, G. We render G by drawing anti-aliased lines along the edges of G that fall inside the window. Including G in the input to the CNN is a noteworthy aspect of the method. First, this allows the CNN to understand which roads in the aerial imagery have been explored earlier in the search, in effect moving the problem of excluding these roads from post-processing to the CNN. Second, it provides the CNN with useful context: e.g., when encountering a portion of aerial imagery occluded by a tall building, the CNN can use the presence or absence of edges on either side of the building to help determine whether the building occludes a road.

The output layer consists of two components: an action component that decides between walking and stopping, and an angle component that decides which angle to walk in.

The action component is a softmax layer with 2 outputs, $O_{action}=(o_{walk}, o_{stop})$. The angle component is a sigmoid layer with a neurons, $O_{angle}$=Each $o_i$ corresponds to an angle to walk in. We use a threshold to decide between walking and stopping. If $o_{walk} \geq T$, then walk in the angle corresponding to $\operatorname{argmax}_i(o_i)$. Otherwise, stop.

The solution does not require complex post-processing heuristics, unlike segmentation-based methods where CNN outputs are noisy. The only post-processing required in the decision function is to check a threshold on the CNN outputs and select the maximum index of the output vector. Thus, the method enables the CNN to directly produce a road network graph.

Iterative Graph Construction CNN Training

We now discuss the training procedure for the decision function. We assume we have a ground truth map G* (e.g., from OpenStreetMap). Training the CNN is non-trivial: the CNN takes as input a partial graph G (generated by the search algorithm) and outputs the desirability of walking at various angles, but we only have this ground truth map. How might we use G* to generate training examples?

Static Training Dataset

In one embodiment we initially attempted to generate a static set of training examples. For each training example, we sample a region $(v_0, B)$ and a step count n, and initialize a search. We run n steps of the search using an "oracle" decision function that uses G* to always make optimal decisions. The state of the search algorithm immediately preceding the nth step is the input for the training example, while the action taken by the oracle on the nth step is used to create a target output $$O^*_{action}=(o^*_{walk}, o^*_{stop}), O^*_{angle}=(o^*_1, \ldots, i^*_a).$$

We can then train a CNN using gradient descent by back-propagating a cross entropy loss between
$O_{action}$ and $O^*_{action}$, and, if $o^*_{walk}=1$, a mean-squared error loss between $O_{angle}$ and $O^*_{angle}$.

However, we found that although the CNN can achieve high performance in terms of the loss function on the training examples, it performs poorly during inference. This is because G is essentially perfect in every example that the CNN sees during training, as it is constructed by the oracle based on the ground truth map. During inference, however, the CNN may choose angles that are slightly off from the ones predicted by the oracle, resulting in small errors in G. Then, because the CNN has not been trained on imperfect inputs, these small errors lead to larger prediction errors, which in turn result in even larger errors.

Figure 5:
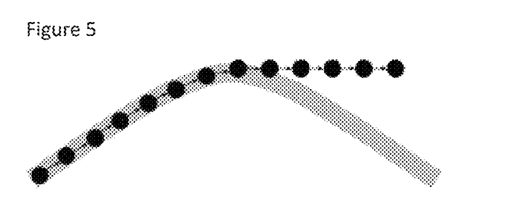

FIG. 5 shows a typical example of this snowball effect. The CNN does not output the ideal angle at the turn; this causes it to quickly veer off the actual road because it never saw such deviations from the road during training, and hence it cannot correct course.

Improved embodiment: We mitigate this problem by using various methods to introduce noise on G in the training examples. Although this reduces the scale of the problem, the CNN still yields low performance at inference time, because the noise that we introduce does not match the characteristics of the noise introduced inherently by the CNN during inference. Thus, we conclude a static training dataset is not suitable.

Dynamic Labels

In some embodiments training examples are generated dynamically by running the search algorithm with the CNN as the decision function during training. As the CNN model evolves, the method generates new training examples.

For example, given a region $(v_0, B)$, training begins by initializing an instance of the search algorithm (G,S), where G is the partial graph (initially containing only $v_0$) and S is the vertex stack. On each training step, as during inference, we feedforward the CNN to decide on an action based on the output layer, and update G and S based on that action.

In addition to deciding on the action, we also determine the action that an oracle would take, and train the CNN to learn that action. The key difference from the static dataset approach is that, here, G and S are updated based on the CNN output and not the oracle output; the oracle is only used to compute a label for back-propagation.

The basic strategy is similar to before. On each training step, based on G*, we first identify the set of angles R where there are unexplored roads from $S_{top}$. Next, we convert R into a target output vector O*. If R is empty, then $o_{stop}^*=1$. Otherwise, $o^*_{walk}-1$, and for each angle $\theta \in R$, we set $o_i^*=1$, where i is the closest walkable angle to $\theta$. Lastly, we compute a loss between O and O*, and apply back-propagation to update the CNN parameters.

A key challenge is how to decide where to start the walk in G* to pick the next vertex. The naive approach is to start the walk from the closest location in G* to $S_{top}$. However, as the example in FIG. 6 illustrates, this approach can direct the system towards the wrong road when G differs from G*.

Figure 6:
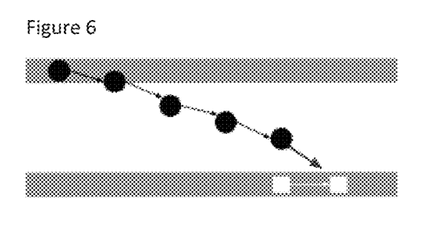

FIG. 6 illustrates a naive oracle that simply matches Stop to the closest location on G* fails, since it directs the system towards the bottom road instead of returning to the top road. Here, the black circles make up G, while the blue corresponds to actual road positions.

To solve this problem, we apply a map-matching algorithm to find a path in G* that is most similar to a path in G ending at $S_{top}$. To obtain the path p in G, we perform a random walk in G starting from $S_{top}$. We stop the random walk when we have traversed a configurable number of vertices w (we use w=10), or when there are no vertices adjacent to the current vertex that haven't already been traversed earlier in the search algorithm walk. Then, we match this path to the path p* in G* to which it is most similar. Some embodiments use a map-matching method based on the Viterbi algorithm. If v is the endpoint of the last edge in p*, we start the walk in G* at v.

Finally, we maintain a set E containing edges of G* that have already been explored during the walk. E is initially empty. On each training step, after deriving p* from map-matching, we add each edge in p* to E. Then, when performing the walk in G*, we avoid traversing edges that are in E again.

The dynamic labelling of some embodiments provides a technical heuristic which prevents the issue of "overfitting".

The method of some embodiments uses incremental graph construction which directly outputs the graph which corresponds to the inferred road network. This approach is not found in the prior art.

A traditional segmentation approach uses classification to label each pixel as either belonging to the "road" or not. After that, manual rules are used to connect pixels which are labelled as road to form the network. Manuals rules are not widely applicable because they are so many exceptions. By contrast the approach of some embodiments uses end to end training to learn the network without resorting to manual rules.

Evaluation

To evaluate the approach, we assemble a large corpus of high-resolution satellite imagery and ground truth road network graphs covering the urban core of forty cities across six countries. For each city, the dataset covers a region of approximately 24 sq km around the city center. We obtain satellite imagery from Google at 60 cm/pixel resolution, and the road network from OSM (we exclude certain non-roads that appear in OSM such as pedestrian paths and parking lots). We convert the coordinate system of the road network so that the vertex spatial coordinate annotations correspond to pixels in the satellite images.

We split the dataset into a training set with 25 cities and a test set with 15 other cities. To the inventors' knowledge, we conduct the first evaluation of automatic mapping approaches where systems are trained and evaluated on entirely separate cities, and not merely different regions of one city, and also the first large-scale evaluation over aerial images from several cities. Because many properties of roads vary greatly from city to city, the ability of an automatic mapping approach to perform well even on cities that are not seen during training is crucial; the regions where automatic mapping holds the most potential are the regions where existing maps are nonexistent or inaccurate.

Baselines. We compare RoadTracer with two baselines: DeepRoadMapper [10] and the own segmentation-based approach. Because the authors were unable to release their software to us, we implemented DeepRoadMapper, which trains a residual network with a soft intersection-over-union (IoU) loss function, extracts a graph using thresholding and thinning, and refines the graph with a set of heuristics and a missing connection classifier.

However, we find that the IoU loss results in many gaps in the segmentation output, yielding poor performance. Thus, we also implement the segmentation approach that outperforms DeepRoadMapper on the dataset, where we train with cross entropy loss, and refine the graph using a four-stage purely heuristic cleaning process that prunes short segments, removes small connected components, extends dead-end segments, and merges nearby junctions.

Metrics. We evaluate RoadTracer and the segmentation schemes on TOPO [3], SP [16], and a new junction metric defined below. TOPO and SP are commonly used in the automatic road map inference literature [4, 14, 17, 1]. TOPO simulates a car driving a certain distance from several seed locations, and compares the destinations that can be reached in G with those that can be reached in G* in terms of precision and recall. SP generates a large number of origin-destination pairs, computes the shortest path between the origin and the destination in both G and G* for each pair, and outputs the fraction of pairs where the shortest paths are similar (distances within 5%).

However, we find that both TOPO and SP tend to assign higher scores to noisier maps, and thus don't correlate well with the usability of an inferred map. Additionally, the metrics make it difficult to reason about the cause of a low or high score.

Thus, we propose a new evaluation metric with two goals: (a) to give a score that is representative of the inferred map's practical usability, and (b) to be interpretable. The metric compares the ground truth and inferred maps junction-by-junction, where a junction is any vertex with three or more edges. We first identify pairs of corresponding junctions (v,u), where v is in the ground truth map and u is in the inferred map. Then, $f_{v,correct}$ is the fraction of incident edges of v that are captured around u, and $f_{u,error}$ is the fraction of incident edges of u that appear around v. For each unpaired ground truth junction v, $f_{v,correct}=0$, and for each unpaired inferred map junction u, $f_{u,error}=1$. Finally, if $n_{correct}=\Sigma_v f_{v,correct}$ and $n_{error}=\Sigma_u f_{u,error}$, we report the correct junction fraction $$F_{correct} = \frac{n_{correct}}{\text{\# junctions in } G^*}$$

and error rate $$F_{error} = \frac{n_{error}}{n_{error} + n_{correct}}$$

TOPO and the junction metric yield a precision-recall curve, while SP produces a single similar path count.

We evaluate performance of the three methods on 15 cities in the test set. We supply starting locations for RoadTracer by identifying peaks in the output of the segmentation-based approach. All three approaches are fully automated.

Both RoadTracer and the segmentation approaches have parameters that offer a tradeoff between recall and error rate (1—precision). We vary these parameters and plot results for the junction metric and TOPO on a scatterplot where one axis corresponds to recall and the other corresponds to error rate. For DeepRoadMapper and the segmentation approach, we vary the threshold used to produce a binary mask. We find that the threshold does not impact the graph produced by DeepRoadMapper, as the IoU loss pushes most outputs to the extremes, and thus only plot one point. For RoadTracer, we vary the walk-stop action threshold T.

Figure 7:
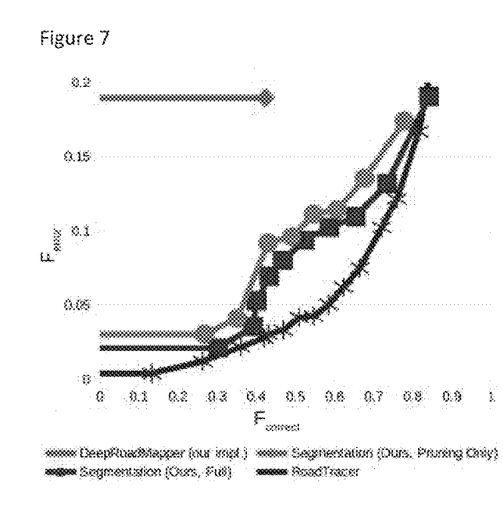
Figure 8:
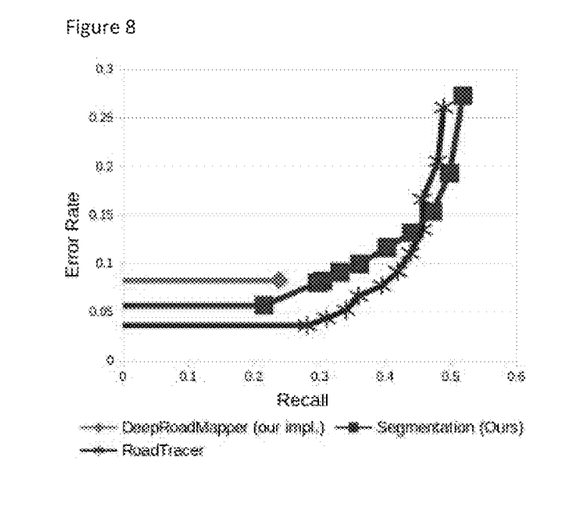

We report performance in terms of average $F_{correct}$ and $F_{error}$ across the test cities in FIG. 7, and in terms of average TOPO precision and recall in FIG. 8.

Table 1 shows performance. For each scheme, we only report results for the threshold that yields the highest correct shortest paths. Long, Short, and NoPath specify different reasons for an inferred shortest path being incorrect (too long, too short, and disconnected).

TABLE 1

| Scheme | Correct | Long | Short | NoPath |
| --- | --- | --- | --- | --- |
| DeepRoadMapper | 0.21 | 0.29 | 0.03 | 0.47 |
| Seg. (Ours) | 0.58 | 0.14 | 0.27 | 0.01 |
| RoadTracer | 0.72 | 0.16 | 0.10 | 0.02 |

Figure 9A:
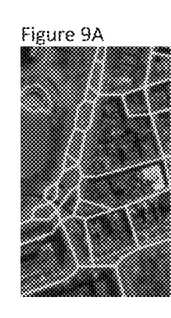
Figure 9B:
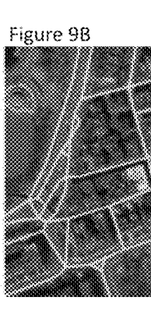
Figure 9C:
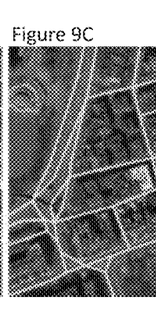

Referring to FIGS. 9A, 9B, and 9C which show the trade-off between error rate and recall in a small crop from Boston as we increase the threshold for the segmentation approach. The junction metric error rates in the crop from left to right are 18%, 13%, and 8%. The map with 18% error is too noisy to be useful.

On the junction metric, RoadTracer has a better $F_{error}$ for a given $F_{correct}$. The performance improvement is most significant when error rates are between 5% and 10%, which is the range that offers the best tradeoff between recall and error rate for most applications—when error rates are over 10%, the amount of noise is too high for the map to be usable, and when error rates are less than 5%, too few roads are recovered (see FIGS. 9A, 9B, and 9C). When the error rate is 5%, the maps inferred by RoadTracer have 45% better average recall ($F_{correct}$) than those inferred by the segmentation approach (0.58 vs 0.40).

On TOPO, RoadTracer has a lower error rate than the segmentation approaches when the recall is less than 0.43. Above 0.43 recall, where the curves cross, further lowering T in RoadTracer yields only a marginal improvement in recall, but a significant increase in the error rate. However, the segmentation approach outperforms RoadTracer only for error rates larger than 0.14; we show in FIG. 9a-9C that inferred maps with such high error rates are not usable.

We report SP results for the thresholds that yield highest number of correct shortest paths in Table 1. RoadTracer outperforms the segmentation approach because noise in the output of the segmentation approach causes many instances where the shortest path in the inferred graph is much shorter than the path in the ground truth graph.

The DeepRoadMapper implementation performs poorly on the dataset. We believe that the soft IoU loss is not well suited to the frequency of occlusion and complex topology found in the city regions in the dataset.

Figure 10:
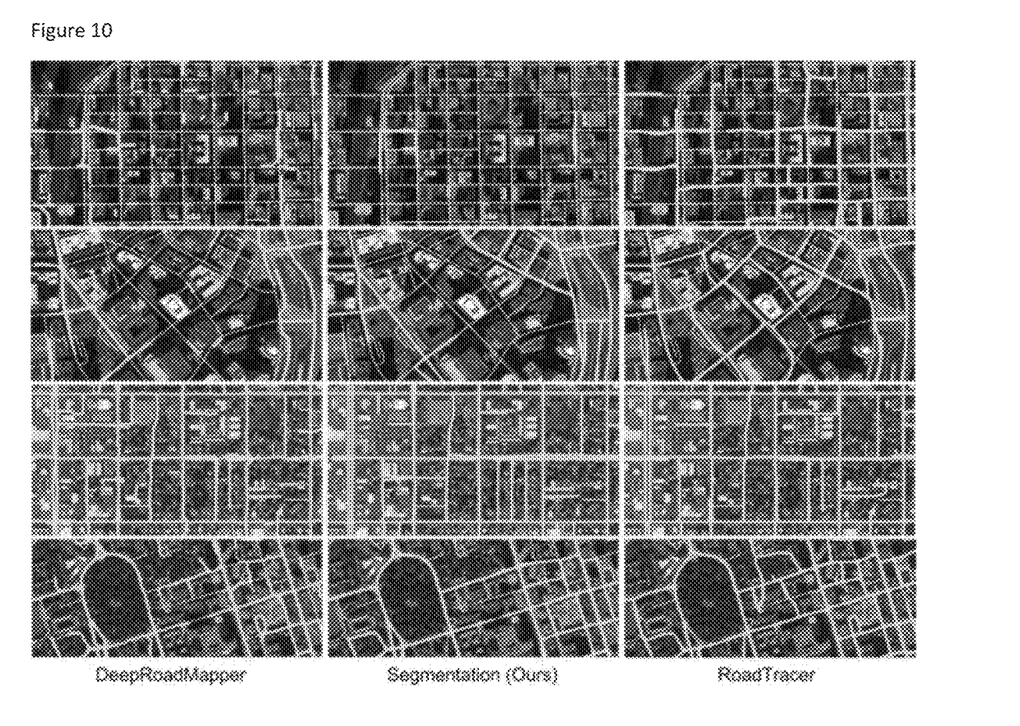

Qualitative Results. In FIG. 10, we show qualitative results in crops from four cities from the test set: Chicago, Boston, Salt Lake City, and Toronto. FIG. 10 compares inferred road networks in Chicago (top), Boston, Salt Lake City, and Toronto (bottom). We overlay the inferred graph (yellow) over ground truth from OSM (blue). Inferred graphs correspond to thresholds that yield 5% average $F_{error}$ for RoadTracer and the segmentation approach, and 19% $F_{error}$ for DeepRoadMapper (as it does not produce results with lower average error).

For RoadTracer and the segmentation approach, we show inferred maps for the threshold that yields 5% average $F_{error}$. DeepRoadMapper only produces one map.

RoadTracer performs much better on frequent occlusion by buildings and shadows in the Chicago and Boston regions. Although the segmentation approach is able to achieve similar recall in Boston on the lowest threshold (not shown), several incorrect segments are added to the map. In the Salt Lake City and Toronto regions, performance is comparable.

The DeepRoadMapper's soft IoU loss introduces many disconnections in all fregions, and the missing connection classifier in the post-processing stage can only correct some of these.

We include more outputs in the supplementary material, and make the code, full-resolution outputs, and videos showing RoadTracer in action available at https://roadmaps.csail.mit.edu/roadtracer.

On the face of it, using deep learning to infer a road network graph seems straightforward: train a CNN to recognize which pixels belong to a road, produce the polylines, and then connect them. But occlusions and lighting conditions pose challenges, and such a segmentation-based approach requires complex post-processing heuristics. By contrast, the iterative graph construction method of some embodiments uses a CNN-guided search to directly output a graph. We showed how to construct training examples dynamically for this method, and evaluated it on 15 cities, having trained on aerial imagery from 25 entirely different cities. To the inventors' knowledge, this is the largest map-inference evaluation to date, and the first that fully separates the training and test cities. The principal experimental finding is that, at a 5% error rate, RoadTracer correctly captures 45% more junctions than the segmentation approach (0.58 vs 0.40). Hence, some embodiments present an important step forward in fully automating map construction from aerial images.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

What is claimed:

1. A method of constructing a road network map from imagery, the method comprising:
  using an iterative search process guided by a decision function implemented by using a convolutional neural network (CNN) to derive a road network graph, the road network graph including vertices which are annotated with spatial coordinates, including latitude and longitude coordinates, and edges corresponding to straight-line road segments, the road network graph being derived directly from an output generated by the CNN.

2. The method of claim 1, wherein the iterative search process constructs the road network map by adding individual road segments one at a time.

3. The method of claim 1, wherein the iterative search process proceeds by starting from a single location known to be on the road network graph and adds the vertices which are annotated with the spatial coordinates and the edges corresponding to the straight-line road segments along a shortest path that the iterative search process follows.

4. The method of claim 1, wherein the CNN-based decision function implemented by the CNN is invoked at each step to determine a best action to take, the best action to take including either to add one of the edges corresponding to the straight-line road segments to the road network being mapped or step back to a previous one of the vertices annotated with the spatial coordinates.

5. The method of claim 1, wherein the method further comprises the decision function deciding on a location of where to start a search algorithm walk action on the road network graph in a ground truth map G* and to pick a next one of the vertices annotated with spatial coordinates by:
applying a map-matching algorithm to find a path p* in the truth map G* that is most similar to a path p in a graph G ending at a vertex $S_{top}$ at the top of the vertices representing the current location of the search;
obtaining the path p in the graph G, by performing a random walk on the road network graph in the graph G starting from the vertex $S_{top}$;
stopping the random walk in the graph G after traversing a configurable number of the vertices or when there are none of the vertices adjacent to the current vertex $S_{top}$ one of the vertices that haven't already been traversed earlier in the search algorithm walk action; and
matching the path p in the graph G to the path p* in the map G* to which it is most similar.

6. The method of claim 5, further comprising using the map-matching algorithm at an endpoint v of a last one of the edges in the path p*, starting the walk action in the map G* at the endpoint v and maintaining a set containing the edges E of the path p* in the map G* that have already been explored during the walk action in the map G*, the set of the edges E is initially empty, and on each training step, after deriving the path p* from the map-matching algorithm, adding each of the edges in path p* to the set of the edges E, then, when performing the walk action in the map G*, avoiding traversing the edges that are in the set of the edges E.

7. The method according to claim 1, wherein the decision function implemented by using a convolutional neural network (CNN) decides on a next segment of the road network map to add given as an input a portion of the road network constructed so far to produce the road network directly from the CNN without generating an intermediate image representation of the road network.

8. The method of claim 1, wherein the decision function repeatedly selects a stop action until the iterative search process returns to a vertex $v_0$ of the vertices and a stack of the vertices S becomes empty, wherein when the stack of the vertices S is empty, the construction of the road network map is complete.

9. The method of claim 1, wherein the imagery comprises one or more aerial images.

10. The method of claim 1, wherein the iterative search process is performed on the imagery in which pixels are classified as "road network" or "non-road network".

11. The method of claim 1, wherein the method comprises performing a training procedure for the decision function.

12. The method of claim 11, wherein the training procedure comprises:
generating training examples by running the iterative search process with the CNN as the decision function during the training procedure.

13. The method of claim 11, wherein the training procedure comprises:
performing a dynamic labelling process to generate the training examples.

14. The method of claim 11, wherein given a region having a starting location at a vertex ($v_0$) of the vertices and a bounding box (B) defining an area in which to infer the road network, the training procedure begins by initialising an instance of a search algorithm of a partial graph (G) initially containing only the starting location at the vertex ($v_0$) generated by the search algorithm and a stack of the vertices (S), and wherein on each step of the training procedure, as during inference, the CNN decides on an action based on an output of the CNN, and updates the partial graph (G) and the vertex stack (S) based on the action.

15. The method of claim 14, comprising updating the partial graph G and the stack of the vertices S based on the action decided by the CNN and not based on a prediction by an oracle as the decision function during the training procedure.

16. The method of claim 14, wherein on each step of the training position, based on map G*, identify a set of angles R where there are unexplored elements of the road network from a vertex ($S_{top}$) at the top of the stack of vertices S,
convert angles R into a target output vector O*,
if angles R is empty, then output stop $O_{stop}$*=1, else output walk $o_{stop}$*=1, and for each of an angle θ∈R, set $o_i$*=1, where i is a closest walkable angle to θ,
compute a loss between O and O* and apply backpropagation to update parameters of the CNN.

17. A system for constructing a road network map from imagery, the system comprising a processor and a non-transitory computer readable medium (CRM), the CRM storing executable instructions which, when executed by the processor, cause the processor to:
use an iterative search process guided by a decision function implemented by using a convolutional neural network (CNN) to derive a road network graph, the road network graph including vertices which are annotated with spatial coordinates, and edges corresponding to line road segments, the road network graph being derived directly from an output generated by the CNN.

18. An apparatus for constructing a road network map from imagery, the apparatus comprising:
a processor;
a non-transitory computer readable medium (CRM), the CRM storing executable instructions which, when executed by the processor, cause the processor to:
utilize a convolutional neural network (CNN)-based decision process to receive and process image data and to output a decision function implemented by using the CNN to derive a road network graph including vertices which are annotated with spatial coordinates, and edges corresponding to line road segments, the road network graph being derived directly from an output generated by the CNN.

* * * * *

UNITED STATES PATENT AND TRADEMARK OFFICE
CERTIFICATE OF CORRECTION

| | | |
|---|---|---|
| PATENT NO. | : 11,823,389 B2 | Page 1 of 1 |
| APPLICATION NO. | : 16/723829 | |
| DATED | : November 21, 2023 | |
| INVENTOR(S) | : Sanjay Chawla | |

It is certified that error appears in the above-identified patent and that said Letters Patent is hereby corrected as shown below:

In the Claims

Claim 16, Column 18, Line 40:
Change "output walk $o_{stop}$*-1" to --output walk $o*_{walk}$-1--.

Signed and Sealed this
Seventeenth Day of December, 2024

Derrick Brent
*Acting Director of the United States Patent and Trademark Office*